United States Patent [19]

Terrell

[11] 4,080,884

[45] Mar. 28, 1978

[54] PIE CRUST SHIELD

[76] Inventor: Gerald K. Terrell, 1517 Vine Hill Rd., Santa Cruz, Calif. 95060

[21] Appl. No.: 624,667

[22] Filed: Oct. 22, 1975

[51] Int. Cl.² ........................ A47J 36/00; A47J 43/00
[52] U.S. Cl. ............................... 99/433; 99/DIG. 15
[58] Field of Search ...................... 99/433, 645, 646 R, 99/DIG. 15

[56] References Cited

U.S. PATENT DOCUMENTS

| 835,212 | 11/1906 | Blynt | 99/DIG. 15 |
| 1,097,367 | 5/1914 | Sabin | 99/DIG. 15 |
| 1,180,782 | 4/1916 | McLaughlin | 99/DIG. 15 |
| 1,827,062 | 10/1931 | Austin | 99/DIG. 15 |
| 2,257,408 | 9/1941 | Alexander | 99/DIG. 15 |
| 2,784,664 | 3/1957 | Tippel | 99/DIG. 15 |

*Primary Examiner*—Richard E. Aegerter
*Assistant Examiner*—Richard R. Stearns
*Attorney, Agent, or Firm*—Robert G. Slick

[57] ABSTRACT

A protective shield for pie crust is provided in the form of four flexible arcuate segments which slip over the edge of a pie tin to prevent the edge of the crust from becoming too brown. The arcuate segments are sufficiently flexible so that a given set can be used on pies of various diameters.

1 Claim, 5 Drawing Figures

PIE CRUST SHIELD

SUMMARY OF THE INVENTION

In baking pies, that portion of the crust which extends over the rim of the pie pan often gets too brown and, in fact, can get burnt, while the other portions of the pie are insufficiently cooked.

In the past it has been proposed to remedy this by providing some form of protector over the rim of the pie pan which can be left on during the entire time which the pie cooks or, preferably, left on during only a portoin of the time. However, the devices proposed in the past have been relatively heavy and expensive and also have lacked flexibility. It was necessary to provide a separate set of protectors for each size of pie pan.

In accordance with the present invention, a flexible protector or shield is provided so that one set of four segments can be used to protect pies of various diameters merely by flexing the protectors slightly.

Further, in accordance with the present invention, a protector is provided of a thin, foil-like material which has a flange at the edge to give it some slight rigidity so that the protectors do not need be made of heavy metal but can be made merely of pressed foil. The protectors are very inexpensive and it is entirely practical to use them once and throw them away, although normally they would be reused a number of times.

Other objects and advantages of the invention will be brought out in the balance of the specification.

BRIEF DESCRIPTION OF THE DRAWINGS

In the drawings forming part of this application.

DESCRIPTION OF THE PREFERRED EMBODIMENTS

Figure 1:
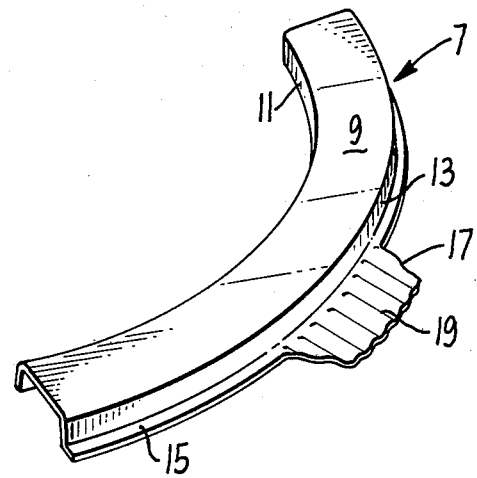
FIG. 1 is a perspective view of one of the protectors embodying the present invention.

Referring now to the drawings by reference characters, one of the protectors is designated 7. It will be understood that the protectors are sold and used in sets of four, but since all of them are identical, only one will be described in detail. The protector 7 has a generally U-shaped cross-section which is comprised of a center flat portion 9, an inner lip 11, an outer lip 13, and a tab 17. The protectors are stamped of aluminum foil and the U-shaped channel is formed as an arc having an angular dimension of just over 90°. The protectors can be made in various sizes but one size can be made to fit several size pie tins. The housewife ordinarily utilizes pie tins which range in size from 8 to 10 inches, and the protectors of the present invention will be described in terms of such sizes. However, it will be later apparent that the protectors can be made in other sizes to fit other ranges of pans. Thus, the protector illustrated has a nominal diameter of 10 inches and on a pie of this size will overlap slightly as is shown in FIG. 4.

The protectors are stamped from aluminum foil, suitably of 0.002 gauge, and to give them additional rigidity as well as some flexibility, the outer wall 13 is provided with a flange 15. In addition, a handle or tab 17 is provided, and in order to give this some rigidity because of the thinness of the foil, the handle is crimped as at 19. The junction between the center portion 9 and the lips 11 and 13 is rounded. A radius of ⅛ inch is suitable.

Figure 2:
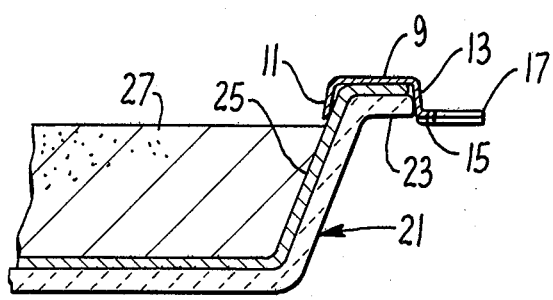
FIG. 2 is a section through the rim of a pie showing a protector in place.
Figure 3:
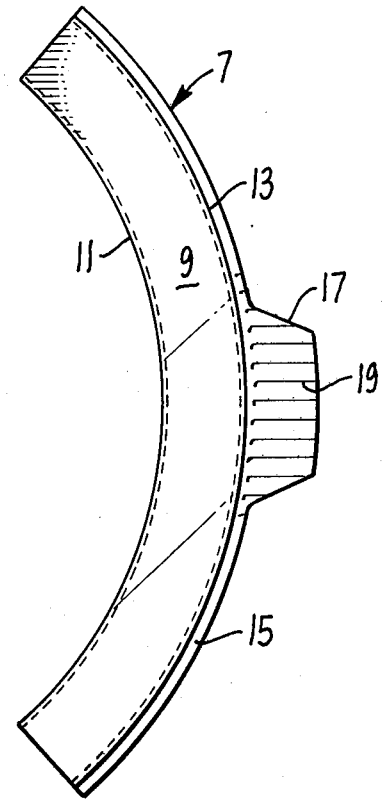
FIG. 3 is an enlarged plan view of a protector embodying the present invention.

FIG. 2 shows a cross-section of a pie with a protector in place. The pie tin generally designated 21 has the usual rim 23 and the pie crust is designated 25 and the pie filling as 27. Though a single crust pie has been shown, it will be readily apparent that the shields could be used equally well with a double crust pie.

Figure 4:
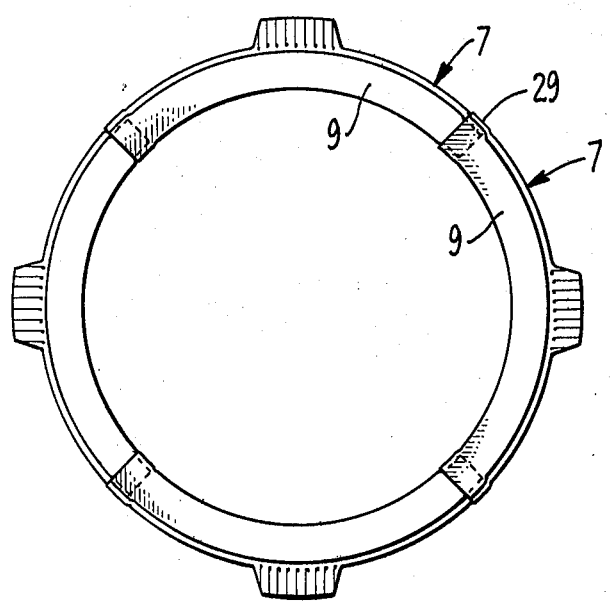
FIG. 4 shows the use of the protectors on a large pie.

FIG. 4 is shown how a series of four of the shields are used on a large pie such as a 10-inch pie. The shields 7 are overlapped very slightly as is shown at 29.

Figure 5:
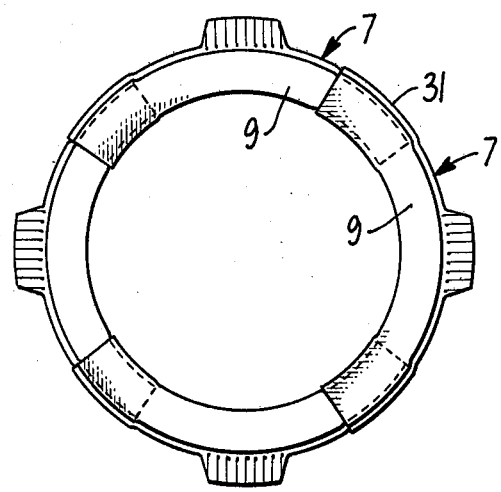
FIG. 5 shows the use of the same protectors on a pie having a smaller diameter.

In FIG. 5 it is shown how the same four shields could be used with a smaller pie such as an 8-inch pie. Here the shields 7 have been overlapped by a substantially greater amount as is shown at 31.

Since the shields are stamped from aluminum foil, it will be readily apparent that they are somewhat flexible and therefore can be distorted slightly to be used with pies of different diameters.

Normally the shields would be used during only a portion of the baking cycle. They would be put on when the edge of the crust was browned to a desirable color and the baking cycle completed with the shields in place.

Although certain specific dimensions have been shown, it will be understood that these are for illustration purposes only and that the shields can be made of various thicknesses of metal and of various diameters as desired. 9n

I claim:

1. A four piece pie crust shield for protecting the edge of a pie crust which lies on the rim of a pie pan comprising an arcuate segment of metal foil, said arcuate segment being somewhat over 90° in angular dimension and having a U-shaped cross-section defined by an inner rim and an outer rim connected together by a flat center portion, and a stiffening flange on the outer rim, and having a tab formed integrally of the same piece of foil as said segment and flange extending from said flange, said tab being crimped to provide reinforcement, whereby a plurality of four of said segments can be placed over the pie rim in overlapping relationship of a pie tin to protect a crust thereon, throughout the entire circumference of the crust, said segments having sufficient flexibility so that they can be used with pies of more than one size.

* * * * *